No. 612,554. Patented Oct. 18, 1898.
L. STRAUSS.
WATER WHEEL.
(Application filed Jan. 20, 1898.)
(No Model.)

WITNESSES:
B. M. Simmt
Chas. H. Luther Jr

INVENTOR:
Louis Strauss
by Joseph A. Miller & Co.
Attys.

UNITED STATES PATENT OFFICE.

LOUIS STRAUSS, OF PROVIDENCE, RHODE ISLAND.

WATER-WHEEL.

SPECIFICATION forming part of Letters Patent No. 612,554, dated October 18, 1898.

Application filed January 20, 1898. Serial No. 667,201. (No model.)

*To all whom it may concern:*

Be it known that I, LOUIS STRAUSS, of Providence, in the county of Providence and State of Rhode Island, have invented a new and useful Improvement in Water-Wheels; and I hereby declare that the following is a full, clear, and exact description of the same, reference being had to the accompanying drawings, forming part of this specification.

This invention has reference to improvements in water-wheels used to utilize the fall of water in generating power.

The invention is particularly designed for what are known in the art as "overshot" water-wheels, but is applicable to breast-wheels.

The invention consists in the peculiar and novel construction of the wheel whereby the weight of the water exerts a greater force on the wheel, as will be more fully set forth hereinafter.

In an overshot water-wheel, and also in a breast-wheel, the work is done by gravity. The weight of the water and the height of the fall determine the power exerted on the wheel. As heretofore constructed, the efficiency of an overshot water-wheel varies between seventy and eighty per cent. of the theoretic value of the water and the height of the fall. An increase in the height of the fall permits the use of a wheel of larger diameter, in which the water acts on the wheel at a greater distance from the center. The loss of efficiency is mainly due to the waste of the residual velocity of the water discharged onto the wheel.

One object of the invention is to utilize the impact of the water as it flows into the buckets of the wheel.

Another object of the invention is to increase the efficiency of the weight of the water by moving the center of gravity of the water received in each bucket farther from the center of the wheel as the buckets descend; and another object of the invention is to retain the water as long as it exerts force and discharge the water more quickly when it ceases to exert useful force on the wheel. To this end I pivotally suspend the buckets on pivotal bearings between the two side frames of the water-wheel and connect the buckets with an eccentric-ring moving with the wheel, but around a center on one side of the center of the wheel, and so rock the buckets as they turn with the wheel that the water flowing from the sluice into the buckets will exert the force of the residual velocity on the inner faces of the fronts of the buckets and continue to swing the buckets so that the weight of the water will act on the wheel farther and farther from the axis of the wheel until it is discharged.

Figure 1:
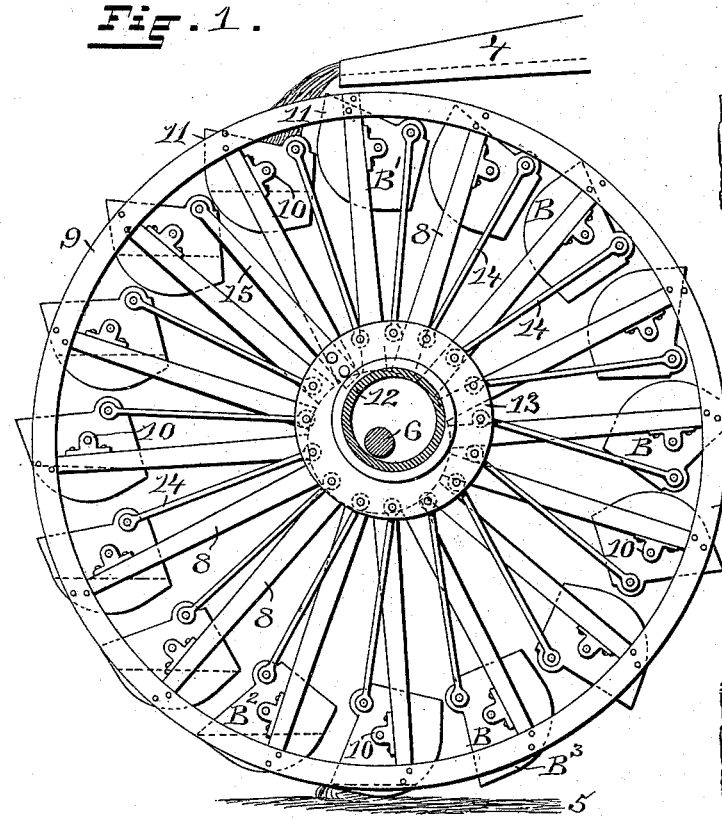
Figure 2:
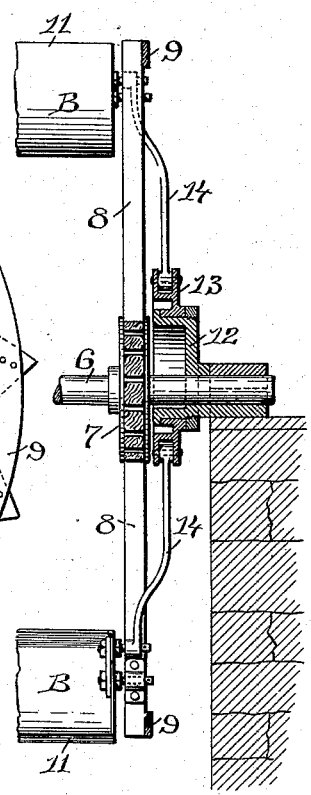
Figure 3:
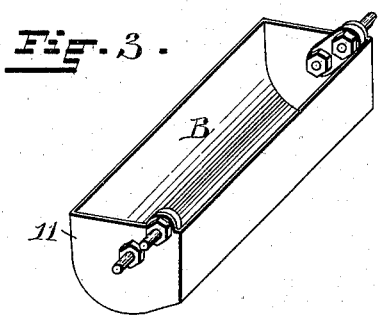

Figure 1 is a side view of my improved water-wheel. Fig. 2 is a transverse sectional view of part of the same. Fig. 3 is a perspective view of one of the buckets.

In the drawings, 4 indicates the sluice, by which the water is supplied to the wheel; 5, the tail-race, into which the water is discharged; 6, the shaft in the center of the wheel, on which the wheel turns and is supported in suitable bearings; 7, the hub of the wheel; 8, the arms or spokes of the wheel, and 9 the rim of the wheel.

The buckets of the wheel are indicated by the letter B. These buckets are pivotally supported on pins projecting from the ends of the buckets journaled in the bearings 10 10, shown in the drawings as secured to the arms 8 of the wheel.

The form of the buckets B B is such that in swinging they may not interfere with each other and prevent the water, as the buckets pass the water discharged from the sluice, from passing between the buckets. The fronts of the buckets present a flat surface 11, against which the water discharged from the sluice in a parabolic curve may impinge as the fronts of the buckets pass through the water.

In practice an overshot or a high-breast water-wheel is usually constructed to give a rim or bucket velocity that allows from one-fourth to one-third of the bucket to be filled, and I place the pivotal supports of the buckets at a point above the normal water-line. An eccentric 12, loose on the shaft 6 and held in the fixed position indicated by forming part of the bearing of the shaft or by securing the same in any other convenient manner, carries the ring 13. The rods 14 connect the buckets B B with the ring 13, and as the ring moves in a path eccentric with the wheel the buckets are swung on their pivotal supports. The ring 13 rotates with the wheel and may be connected with the same in any suitable manner. One method is shown in Fig. 1, where the arm 15 is shown rigidly secured to the ring 13 and to the pin on the bucket, so that the bucket withdraws the ring around with the wheel.

I do not wish to confine myself to the exact construction of the parts herein shown, as they may be varied without materially affecting the beneficial result secured by my invention.

The operation of the wheel is clearly indicated in Fig. 1. The bucket B' is at the point of entering the stream of water and will receive the impact on the face 11 at the front of the bucket. As the buckets descend the swinging of the buckets causes the water to move farther from the axis of the wheel, the bucket B² contains still the normal quantity of water, the next bucket is discharging the water, and the bucket B³ is empty.

Having thus described my invention, I claim as new and desire to secure by Letters Patent—

1. In a water-wheel, the combination with the frame of the wheel and buckets pivotally supported near the periphery of the wheel, of mechanism for swinging the buckets, consisting of an eccentric-ring and connections between the ring and the buckets; whereby the buckets are swung on their pivotal supports and the water carried by the buckets is moved farther from the center of the wheel, as described.

2. In a water-wheel, the combination with the frame of the wheel, of the buckets B B, the front of said buckets having the flat surface 11, pivotal supports on the ends of the buckets, journal-bearings for the buckets on the wheel, an eccentric supporting a ring, and connections between the ring and the buckets whereby the buckets are swung on their pivotal end supports as they rotate with the wheel, as described.

3. In a water-wheel, the combination with the shaft 6, the hub 7 and the end bearings of the shaft, of the arms 8, the rim 9, the buckets B B provided with pivotal end supports, the bearings 10 10 secured to the wheel, the eccentric 12, the ring 13 rotating on the eccentric, and the rods 14 connecting the eccentric with the buckets; whereby the buckets are presented to the flow of the water to utilize the impact of the same and are swung, as they move with the wheel, to carry the water farther from the center of the wheel, as described.

In witness whereof I have hereunto set my hand.

LOUIS STRAUSS.

Witnesses:
   JOSEPH A. MILLER, Jr.,
   B. M. SIMMS.